(12) United States Patent
Rivalsi

(10) Patent No.: US 7,945,717 B2
(45) Date of Patent: May 17, 2011

(54) METHOD AND APPARATUS FOR PROVIDING USB PASS THROUGH CONNECTIVITY

(75) Inventor: Kenneth Rivalsi, Lake Grove, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 129 days.

(21) Appl. No.: 12/331,152

(22) Filed: Dec. 9, 2008

(65) Prior Publication Data

US 2010/0146164 A1 Jun. 10, 2010

(51) Int. Cl.
*G06F 13/12* (2006.01)
*G06F 3/00* (2006.01)
(52) U.S. Cl. .................. 710/62; 710/8; 710/15; 710/305
(58) Field of Classification Search .................. None
See application file for complete search history.

(56) References Cited

U.S. PATENT DOCUMENTS

| | | | |
|---|---|---|---|
| 6,000,000 A * | 12/1999 | Hawkins et al. | 707/610 |
| 6,609,928 B1 | 8/2003 | Le | |
| 2004/0088452 A1* | 5/2004 | Scott | 710/62 |
| 2005/0021880 A1* | 1/2005 | Robbin et al. | 710/15 |
| 2008/0276103 A1 | 11/2008 | Cheng | |

* cited by examiner

*Primary Examiner* — Alan Chen

(57) ABSTRACT

Methods, systems, and devices for facilitating pass-through USB connectivity are provided. A computing device engages with an accessory device such that the computing device connects to a corresponding USB engine in the accessory device. A signal corresponding to an engagement of an external device to the accessory device is detected and a determination of whether to disconnect the computing device from the corresponding USB engine is made as a function of a set of logic operations upon detecting the signal. A USB connection between the computing device and the external device is established as a function of the set of logic operations such that the USB connection is only established if the computing device has been disconnected from the accessory device.

20 Claims, 13 Drawing Sheets

METHOD AND APPARATUS FOR PROVIDING USB PASS THROUGH CONNECTIVITY

TECHNICAL FIELD

The subject invention relates generally to universal serial bus (USB) devices, and more particularly towards methods and systems for facilitating pass-through USB connectivity.

BACKGROUND

Advances in computer technology (e.g., microprocessor speed, memory capacity, data transfer bandwidth, software functionality, and the like) have generally contributed to increased computer application in various industries. In particular, there has been increased development in applications involving USB-enabled devices. In FIG. 1, for example, an illustration is provided of a conventional USB accessory device 120 attached to a handheld device 110. Here, USB accessory device 120 may have been developed so as to enable handheld device 110 to perform certain functions it would otherwise not be able to perform on its own (e.g., Biometric Smart Card Reader, RFID Reader, etc.). FIG. 2 provides another example in which a cradle device 220 was developed to connect a handheld device 210 to a personal computer (PC) 230 via USB protocol, as shown.

It should, however, be noted that the USB protocol depends upon a physical disconnect and/or connect event for automatic detection and configuration. For instance, if handheld device 110 was engaged with conventional accessory USB device 120, the two devices could not be inserted as a single unit into cradle device 220. Within such scenario, connection of a third USB device (i.e., cradle device 220) causes problems since there is no physical or logical break between handheld device 110 and accessory device 120 before cradle device 220 is physically attached. In fact, if cradle device 220 is attached while handheld device 110 is still engaged with accessory device 120, for some period of time (seconds), handheld device 110 will have two different USB devices (accessory device 120 and cradle device 220) attached and perhaps attempting to communicate with handheld device 110 at the same time. As a result, handheld device 110 may not function properly.

Accordingly, there is a need for a method and system that facilitates pass-through USB connectivity. The above-described deficiencies are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Embodiments of a method, device, and system for facilitating pass-through USB connectivity are described. In various non-limiting embodiments, a method includes engaging at least one computing device with an accessory device such that the at least one computing device connects to a corresponding USB engine in the accessory device. The method further includes detecting a signal corresponding to an engagement of an external device to the accessory device and determining whether to disconnect the at least one computing device from the corresponding USB engine upon detecting the engagement of the external device to the accessory device. Within such embodiment, the determining step is a function of a set of logic operations. The method also includes establishing a USB connection between the at least one computing device and the external device as a function of the set of logic operations such that the USB connection is only established if the at least one computing device has been disconnected from the accessory device.

In another non-limiting embodiment, a USB accessory device includes at least one USB engine component and a computing device-USB connector component configured to provide USB connectivity between the at least one USB engine component and at least one corresponding computing device. The USB accessory device also includes an external-USB connector component configured to provide USB connectivity between the at least one computing device and an external device. A detection component is also included and configured to detect if the external device is engaging with the USB accessory device. The device further includes a processor coupled to the detection component and configured to execute a set of logic operations upon detecting that the external device is engaging with the USB accessory device. Within such embodiment, the set of logic operations determines whether to break the USB connectivity between the at least one USB engine component and the at least one corresponding computing device such that the USB connectivity between the at least one computing device and the external device is only established after breaking the USB connectivity between the at least one USB engine component and the at least one corresponding computing device.

In yet another non-limiting embodiment, a system includes means for attaching at least one computing device to an accessory device such that the at least one computing device connects to a corresponding USB engine in the accessory device. The system further includes means for detecting a signal corresponding to an engagement of an external device to the accessory device and means for ascertaining whether to disconnect the at least one computing device from the corresponding USB engine upon detecting the engagement of the external device to the accessory device. Within such embodiment, the means for ascertaining is a function of a set of logic operations. The method also includes means for providing a USB connection between the at least one computing device and the external device as a function of the set of logic operations such that the USB connection is only provided if the at least one computing device has been disconnected from the accessory device.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
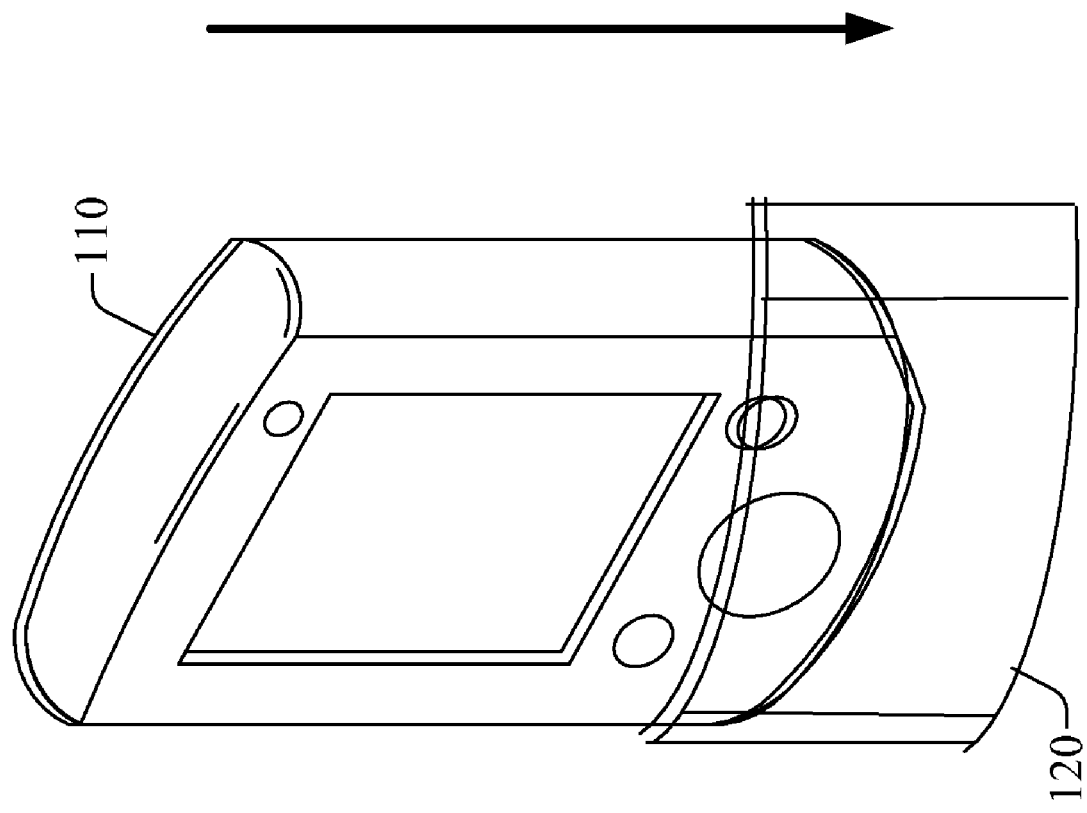
FIG. 1 is an exemplary pictorial schematic of a computing device attached to a USB accessory device.
Figure 2:
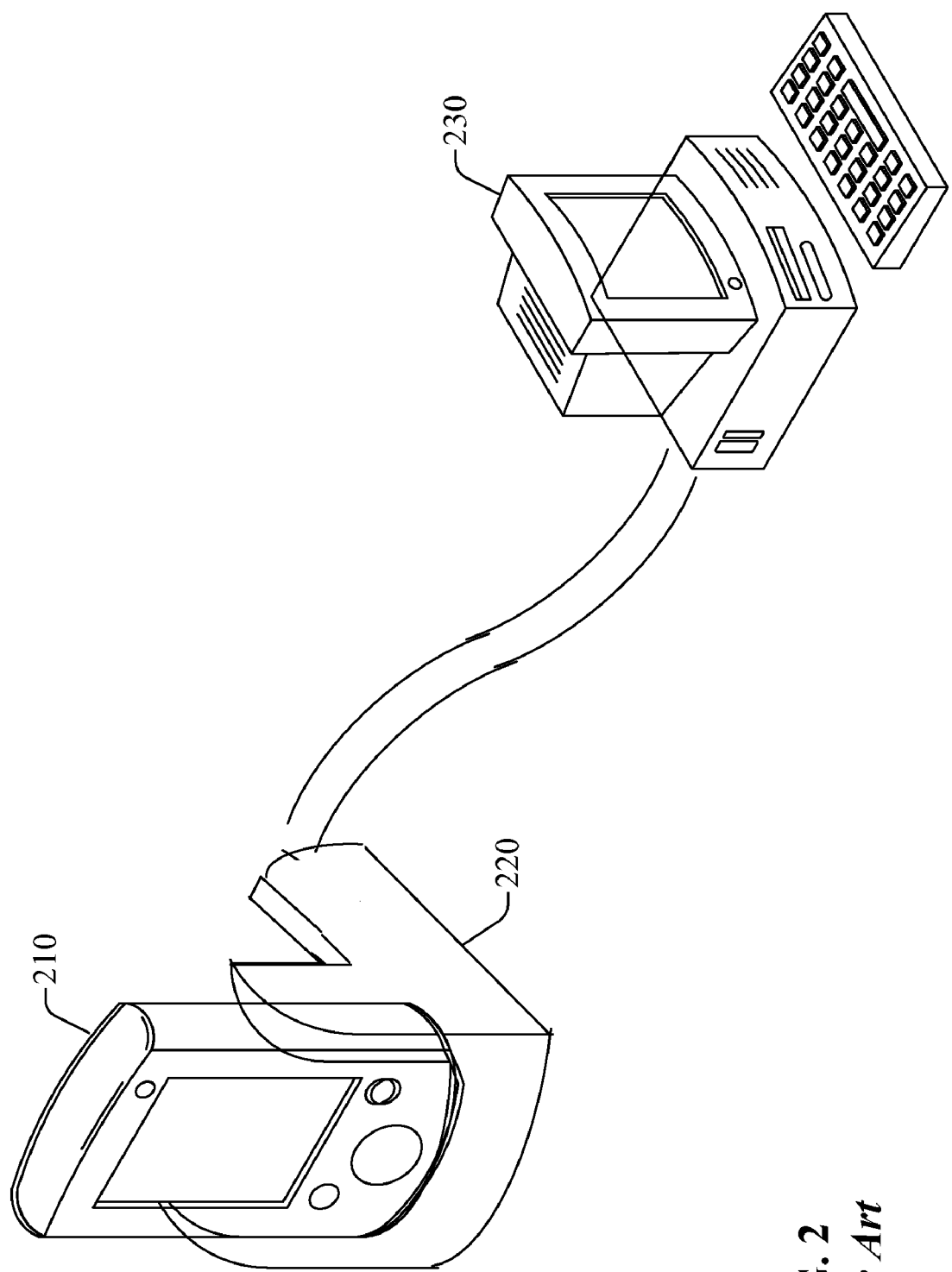
FIG. 2 is an exemplary pictorial schematic of a PC attached to a cradle device.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident; however, that such matter can be practiced without these specific details. In other instances, well-known structures and devices are shown in block diagram form in order to facilitate describing the claimed subject matter.

As utilized herein, terms "component," "system," "data store," "engine," "template," "manager," "network," "profile," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Figure 3:
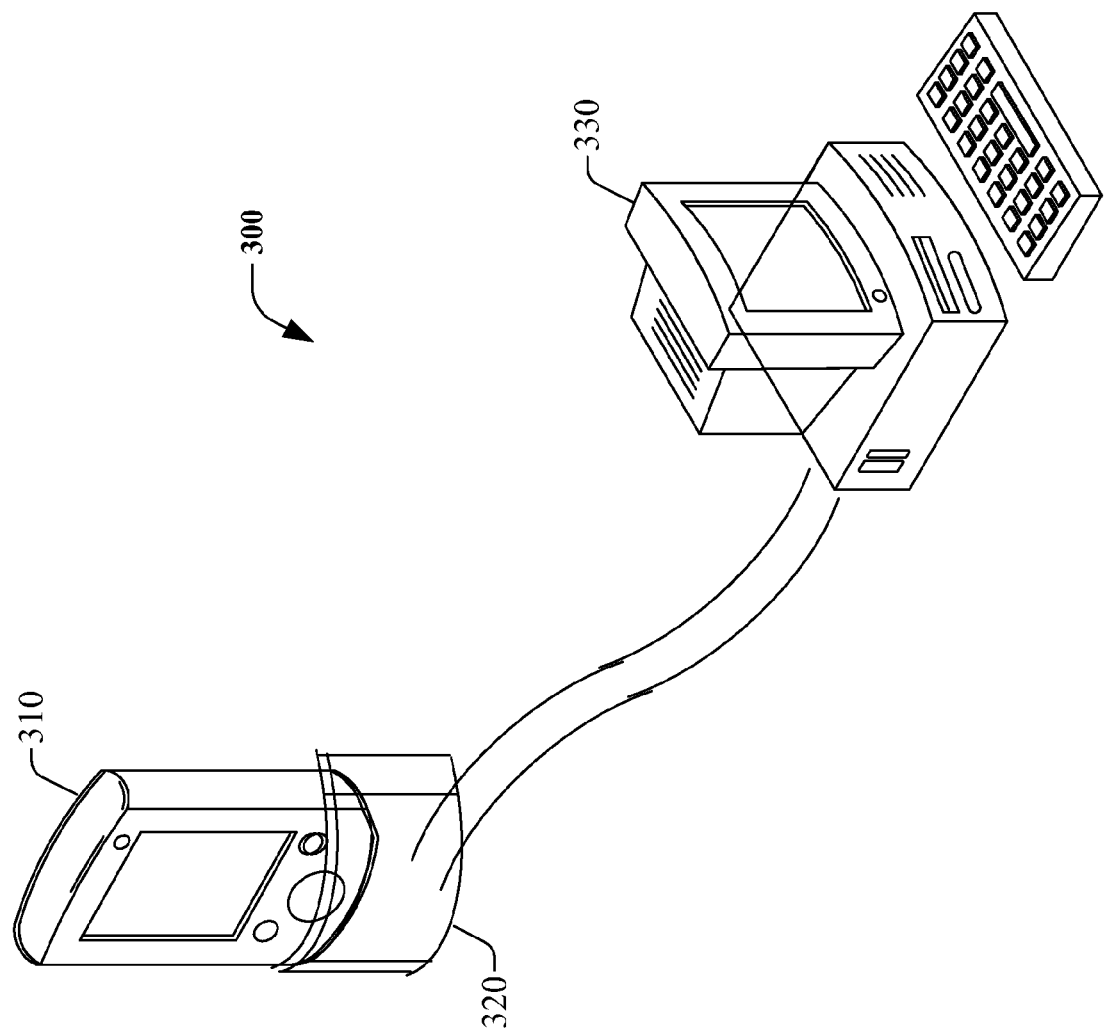
FIG. 3 is an exemplary pictorial schematic of a system configured to provide USB pass-through connectivity in accordance with an aspect of the subject specification.

Referring now to FIG. 3, an exemplary pictorial schematic of a system configured to provide USB pass-through connectivity in accordance with an aspect of the subject specification is provided. As illustrated, system 300 includes handheld device 310 engaged with USB accessory device 320. While engaged, accessory device 320 enhances handheld device 310 by providing it with additional features/functions via a USB connection. Within such embodiment, accessory device 320 is configured to engage with PC 330 via USB protocol while still engaged with handheld device 310. Moreover, accessory device 320 is configured to detect whether PC 330 is engaging with accessory device 320 so as to determine whether to provide pass-through USB connectivity between handheld device 310 and PC 330, or whether to ignore PC 330 and continue to provide the additional features/functions to handheld device 310. Here, it should be appreciated that each of handheld device 310, USB accessory device 320, and/or PC 330 may be devices operable as either a USB host, a USB client, or a USB client and host. Similarly, hereinafter, it should be further appreciated that any of the disclosed USB enabled device (e.g., computing devices, accessory devices, external devices, etc.) may be operable as either a USB host, a USB client, or a USB client and host.

Figure 4:
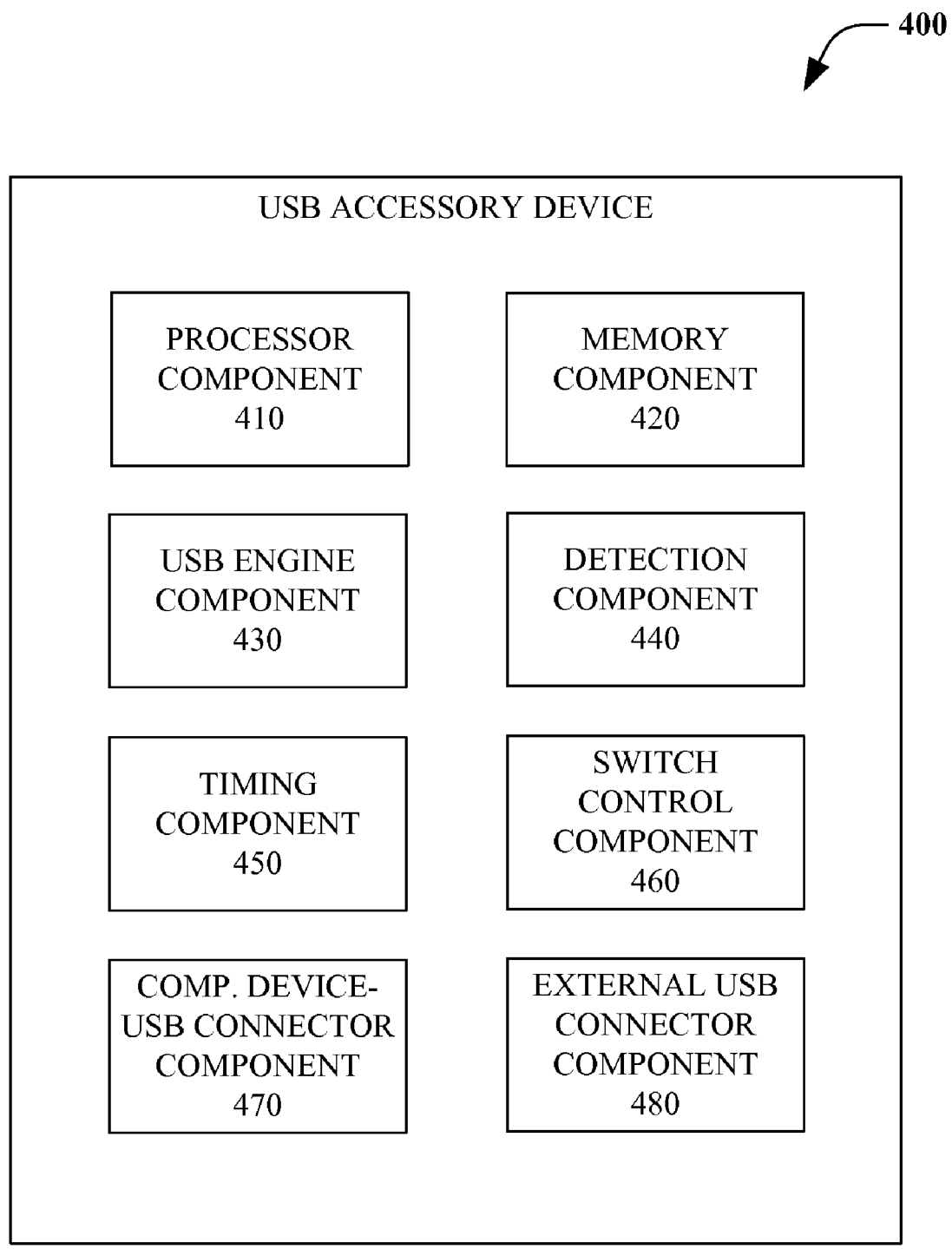
FIG. 4 illustrates a block diagram of an exemplary USB accessory device for facilitating USB pass-through connectivity in accordance with an aspect of the subject specification.

Referring now to FIG. 4, a block diagram of an exemplary USB accessory device for facilitating USB pass-through connectivity in accordance with an aspect of the subject specification. Within such embodiment, USB accessory device 400 may comprise any of a plurality of components including processor component 410, memory component 420, USB engine component 430, detection component 440, timing component 450, switch control component 460, computing device-USB connector component 470, and external USB connector component 480, as shown.

In one aspect, USB accessory device 400 may include USB engine component 430. Within such embodiment, because USB accessory device 400 may be utilized to provide enhanced features/functions to a computing device, USB engine component 430 may be included to provide such features/functions. It should, however, be appreciated that USB engine component 430 may be configured to include a plurality of individual USB engines so as to accommodate for a plurality of computing devices.

In another aspect, processor component 410 is configured to execute instructions for performing any of a plurality of functions. In a particular embodiment, processor component 410 is configured to execute a set of logic operations upon detecting that an external device (e.g., a PC, cradle device, etc.) is engaging with the USB accessory device 400. Within such embodiment, the set of logic operations determines whether to provide pass-through USB connectivity between an attached USB computing device and the detected external USB device. In one aspect, the set of logic operations dictates that processor component 410 must first execute instructions to break a USB connection between the computing device and USB engine component 430 before providing such pass-through connectivity. In another aspect, the set of logic operations may dictate that processor component 410 execute instructions to ignore the detected external device (i.e., instructions that the external device should remain electrically disconnected from the computing device) such that the computing device continues to receive enhanced features/functions from USB accessory device 400 via USB engine component 430. In yet another aspect, processor component 410 may be configured to execute instructions in which a USB connection between the computing device and USB engine component 430 is broken so as to allow USB engine component 430 to connect directly to the detected external device.

As illustrated, USB accessory device 400 may also include switch control component 460. Within such embodiment, switch control component 460 is coupled to processor component 410 and configured to establish and/or break USB connections according to respective executions of the set of logic operations. Moreover, switch control 460 may be configured to establish and/or break USB connections between the computing device and USB engine component 430, the computing device and the external device, and/or the external device and USB engine component 430. Also, as stated previously, because USB engine component 430 may include a plurality of individual USB engines to accommodate for multiple computing devices, switch control 460 may be further configured to establish and/or break USB connections between individual computing devices and their corresponding USB engines within USB engine component 430.

Accessory device 400 may also include memory component 420. Within such embodiment, memory component 420 is coupled to processor component 410 and configured to store instructions executed by processor component 410 including the set of logic operations. Here, it should be appreciated that, although such instructions may be pre-programmed into memory component 420, memory component 420 may also be configured to store instructions received from a computing device and/or external device. Files, objects, and other types of data corresponding to particular applications provided to computing devices may also be stored in memory component 420.

In another aspect, USB accessory device 400 also includes detection component 440. Detection component 440 may be utilized by processor component 410 as a trigger for executing a particular set of logic operations. In a particular embodiment, detection component 440 is utilized to detect whether an external device is engaging with USB accessory device 400 and, if so, detection component 440 is configured to send a signal corresponding to such detection to processor component 410. In other embodiments, detection component 440 may also ascertain particular device characteristics related to the detected external device which processor component 410 may then utilize to perform more complex logic operations.

Furthermore, in addition to detecting an external device engaging with USB accessory device 400, it should be appreciated that detection component 440 may be configured to detect whether a subsequent external device has engaged with the initial external device (such detection may, for example, result from a signal being relayed from the initial external device to USB accessory device 400). Such configuration may be useful if, for example, multiple USB accessory devices 400 are serially engaged with the computing device so as to respectively provide the computing device with a unique feature/function corresponding to the particular accessory device 400. Within such embodiment, processor component 410 may be configured to toggle between each of these features/functions by respectively instructing each accessory device 400 to provide an appropriate pass-through configuration.

As illustrated, USB accessory device 400 may also include computing device-USB connector component 470. Computing device-USB connector component 470 may be utilized to provide USB connectivity between computing devices and USB accessory device 400. Such computing devices may, for example, include the aforementioned handheld device and/or any other USB-enabled computing device. Here, because some embodiments may include multiple computing devices attaching to accessory device 400, it should be appreciated that computing device-USB connector component 470 may be configured to include multiple individual USB connectors. Within such embodiments, it should be further appreciated that each of the individual USB connectors may provide USB connectivity between each of the computing devices and a corresponding USB engine in USB engine component 430.

In a further aspect, USB accessory device 400 may also include external USB connector component 480. External USB connector component 480 may be utilized as an interface between USB accessory device 400 and external USB devices for which pass-through USB connectivity to a computing device may be sought. Such external devices may, for example, include the aforementioned cradle device, a PC, and/or another USB accessory device 400.

For some embodiments, accessory device 400 may also include timing component 450. In such embodiments, timing component 450 is coupled to processor component 410 and configured to delay the establishment of subsequent USB connections once a particular USB break has been made. Such a delay may, for example, be necessary to ensure safe USB operability. Here, however, it should be noted that processor component 410 may utilize timing component 450 differently depending on the type of USB connection being broken and/or the type of USB connection sought to be established. For instance, because different types of computing devices/external devices (e.g., different models) may be connected to USB accessory device 400, a unique delay may be implemented for each device and/or device combination. It should be further noted that such delay may be configured to dynamically vary depending on operating conditions and/or be fixed according to a predetermined value.

Figure 5:
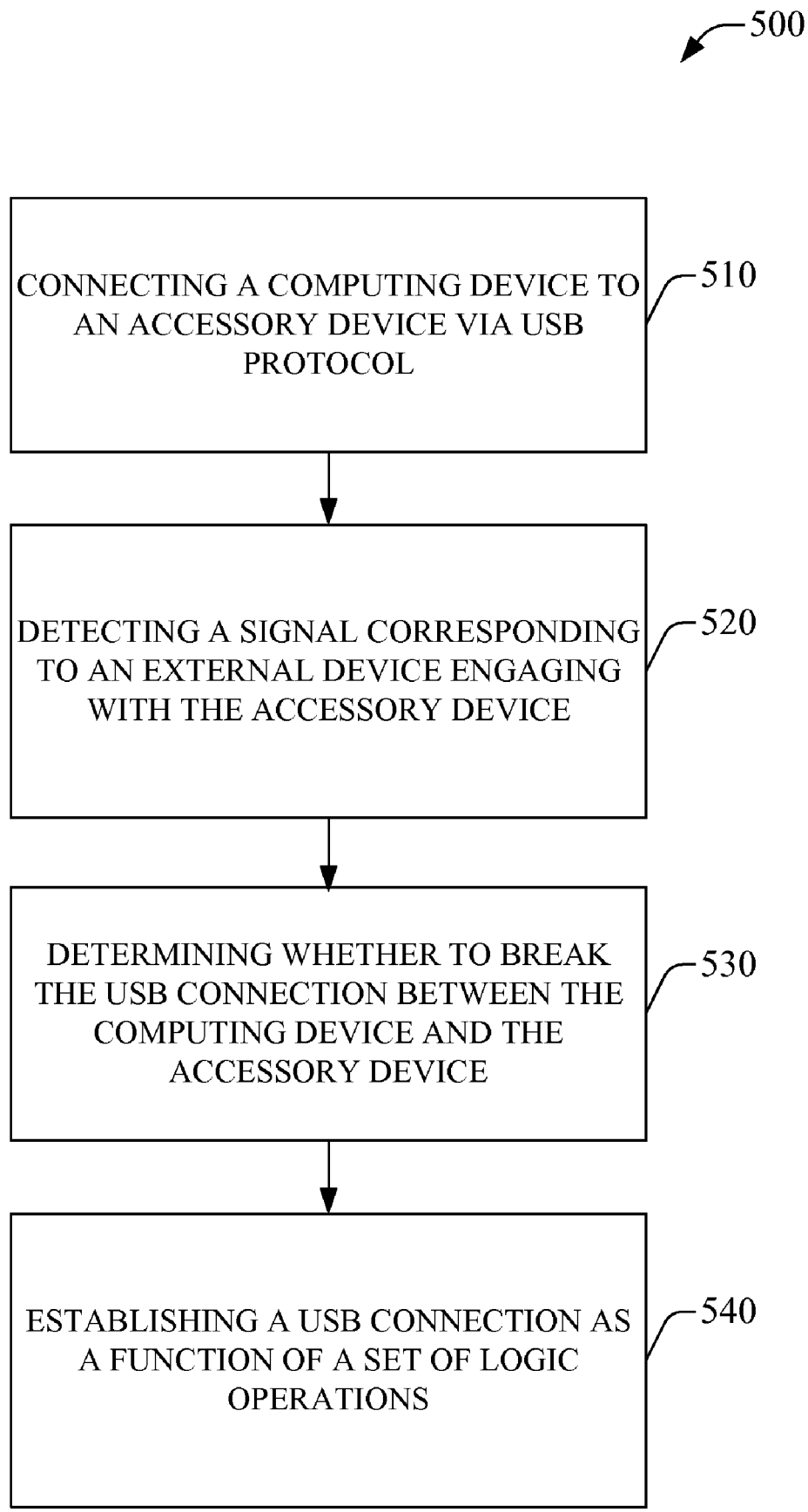
FIG. 5 illustrates a flowchart of an exemplary methodology for facilitating USB pass-through connectivity in accordance with an aspect of the subject specification.

Referring next to FIG. 5, a flowchart of an exemplary methodology for facilitating USB pass-through connectivity in accordance with an aspect of the subject specification is provided. As illustrated, process 500 begins at step 510 where a USB computing device is connected to a USB accessory device via USB protocol. Because USB accessory device may be configured to accept multiple computing devices, step 510 may also include connecting a plurality of computing devices to the USB accessory device. In one aspect, once connected, any of a plurality of software applications are provided to the computing device(s), wherein the software applications are stored within a memory component of the USB accessory device.

Next, at step 520, process 500 continues by detecting whether an external USB device (e.g., a PC, cradle device, etc.) is attempting to establish a USB connection with the USB accessory device. A signal corresponding to this detection is then relayed to a processor within the USB accessory device where it is input to a set of logic operations. As stated previously, such signal may further include other useful information such as device characteristics corresponding to the external device, as well as whether a subsequent external device is attempting to engage with the initial external device. Another characteristic that may be included in such a detection signal is an indication of whether any of the external devices are disengaging from other external devices and/or the USB accessory device.

Upon detecting that an external device is engaging/disengaging at step 520, process 500 then determines whether to break the USB connection between the USB accessory device and any of the attached computing devices at step 530. In one aspect, such determination may be made as a function of a set of logic operations which are either pre-programmed into the USB accessory device and/or received from a computing device.

Finally, at step 540, process 500 concludes with a USB connection being established as a function of the set of logic operations. Here, such establishing step 540 may include simply maintaining the USB connection between the computing device(s) and the USB accessory device, wherein the detected external device(s) are ignored. In other embodiments, however, establishing step 540 may be preceded by breaking the USB connection between a particular computing device and the USB accessory device. For instance, in one such embodiment, establishing step 540 may include providing pass-through USB connectivity between one of the computing devices and one of the detected external devices. Here, it should be appreciated that the presence of multiple computing devices and/or multiple external devices may require specialized logic to determine which computing device to connect to which external device. In yet another embodiment, establishing step 540 may be preceded by breaking the USB connection between a particular computing device and the USB accessory device so as to allow USB connectivity between the USB accessory device and a detected external device.

Figure 6:
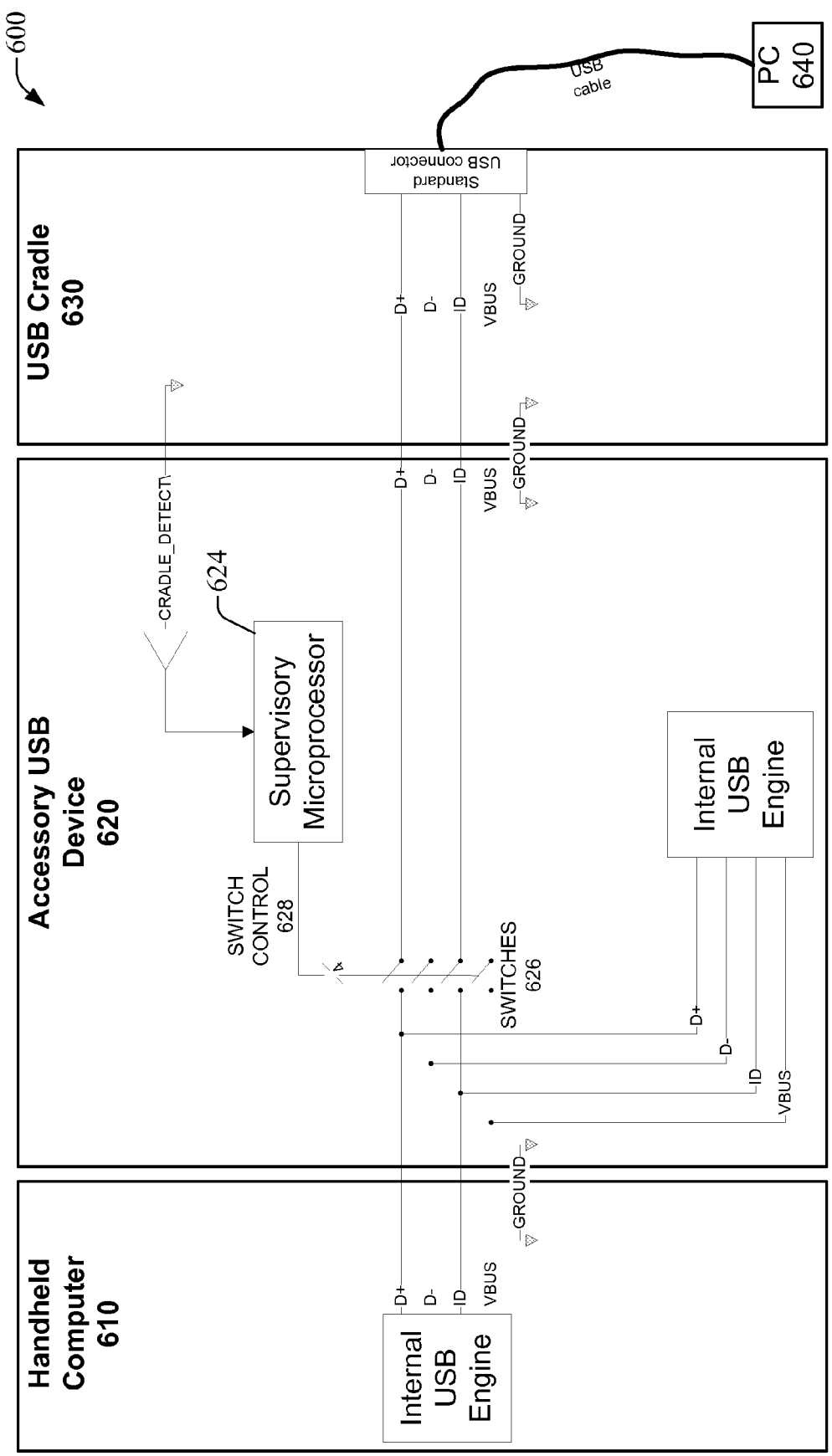
FIG. 6 is a schematic circuit diagram illustrating an exemplary embodiment for facilitating USB pass-through connectivity in accordance with an aspect of the subject specification.

Referring next to FIG. 6, a schematic circuit diagram illustrating an exemplary embodiment for facilitating USB pass-through connectivity in accordance with an aspect of the subject specification is provided. As illustrated, exemplary system 600 includes handheld computing device 610, accessory USB device 620, USB cradle device 630, and personal computer (PC) 640. Within such embodiment, accessory USB device 620 controls the 'making' and 'breaking' of the USB signals through the use of microprocessor 624. As illustrated, microprocessor 624 may be configured to detect when cradle device 630 is attempting to establish USB connectivity with accessory USB device 620. Upon detecting cradle device 630, microprocessor 624 may then perform logic operations to determine whether to open or close switches 626 via switch control signals 628. By controlling these signals, accessory USB device 620 may provide a USB "pass-through" function between cradle device 630 and handheld device 610 while still providing standard USB functions on its primary USB connector.

In one aspect, this is accomplished by controlling the USB signals "USB_ID", "USB_D+", "USB_D−" and "USB_VBUS". This control of the USB lines includes 'making' and 'breaking' USB pass-through connections and may include specific timing as needed to allow an interruption followed by connection of the USB device signals of handheld device 610 and cradle device 630, which are under control of accessory USB device 620. This allows both handheld device 610 and cradle device 630 to be industry standard USB devices.

To better illustrate exemplary timing aspects of system 600, an operational scenario is provided according to a particular embodiment. For this scenario, handheld device 610 and accessory USB device 620 are initially connected and communicating via USB protocol. Next, handheld device 610 and accessory USB device 620 are placed, as a single unit, into cradle 630. Accessory USB device 620 senses cradle 630 by detecting the CRADLE_DETECT signal which may, for example, cause device 620 to break its USB connection to handheld device 610 by disconnecting each of USB_VBUS, USB_ID, USB_D+ and USB_D−. Handheld device 610 thus assumes that a USB disconnect has been made, which causes it to unload its USB software drivers. Next, accessory USB device 620 delays approximately one second and then closes the pass-through connection switch 626 corresponding to USB_VBUS. Accessory USB device 620 then also closes each of switches 626 corresponding to USB_ID, USB_D+ and USB_D−. As a result, handheld device 610 sees a standard USB connection from cradle 630, which allows for normal USB communication.

Figure 7:
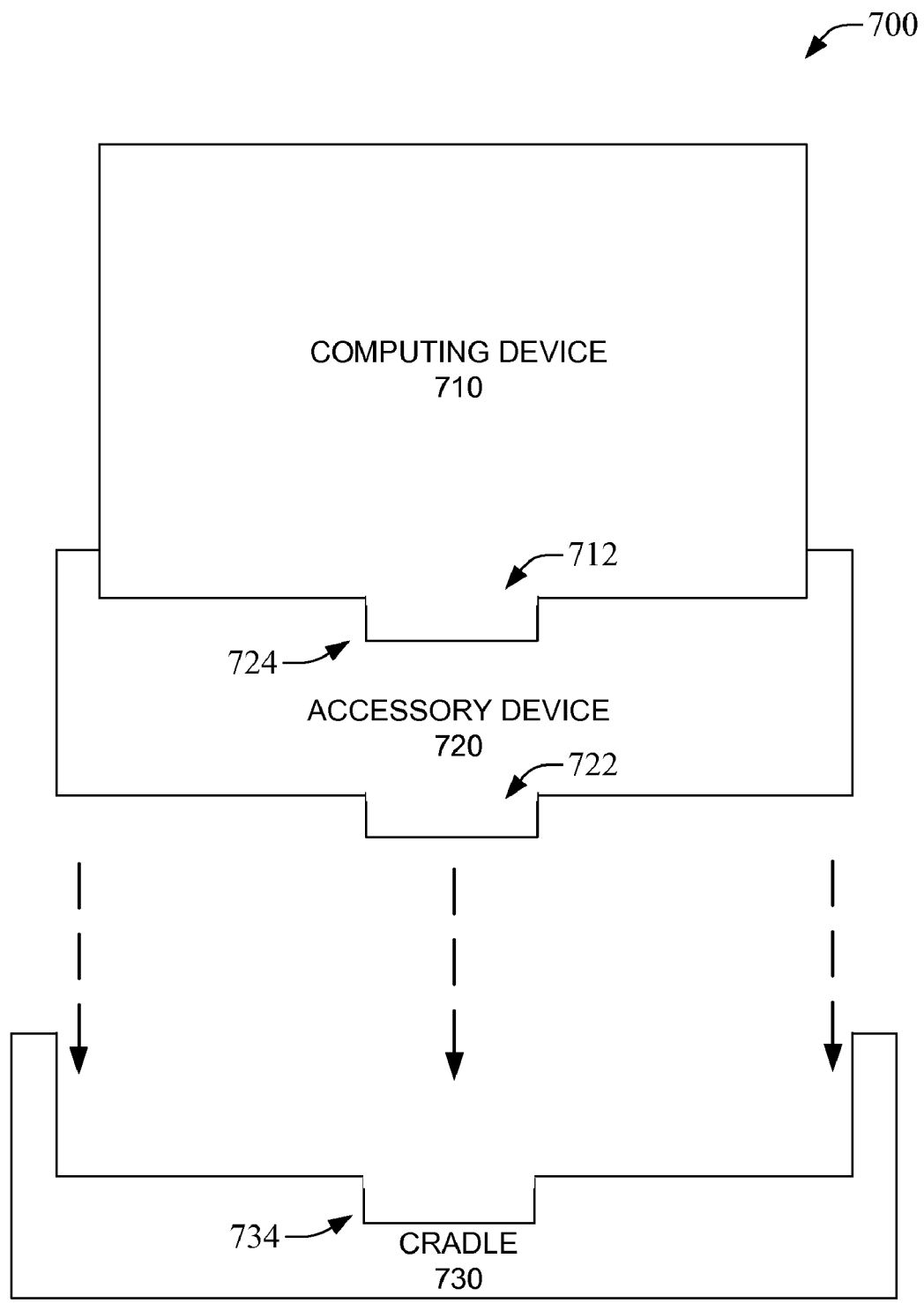
FIG. 7 is a schematic diagram illustrating an exemplary system for facilitating USB pass-through connectivity between a computing device and a cradle device in accordance with an aspect of the subject specification.

Referring next to FIG. 7, a schematic diagram illustrating an exemplary system for facilitating USB pass-through connectivity between a computing device and a cradle device in accordance with an aspect of the subject specification is provided. As illustrated, system 700 includes computing device 710 attached to USB accessory device 720. Within such embodiment, this attachment is achieved by mating male USB connector 712 of computing device 710 with female USB connector 724 of USB accessory device 720. USB accessory device 720 may, however, further include male USB connector 722, as shown. Within such embodiment, the engaged assembly of USB accessory device 720 and computing device 710 may thus be attached as a single unit to cradle 730 by mating male USB connector 722 with female USB connector 734 of cradle 730.

Figure 8:
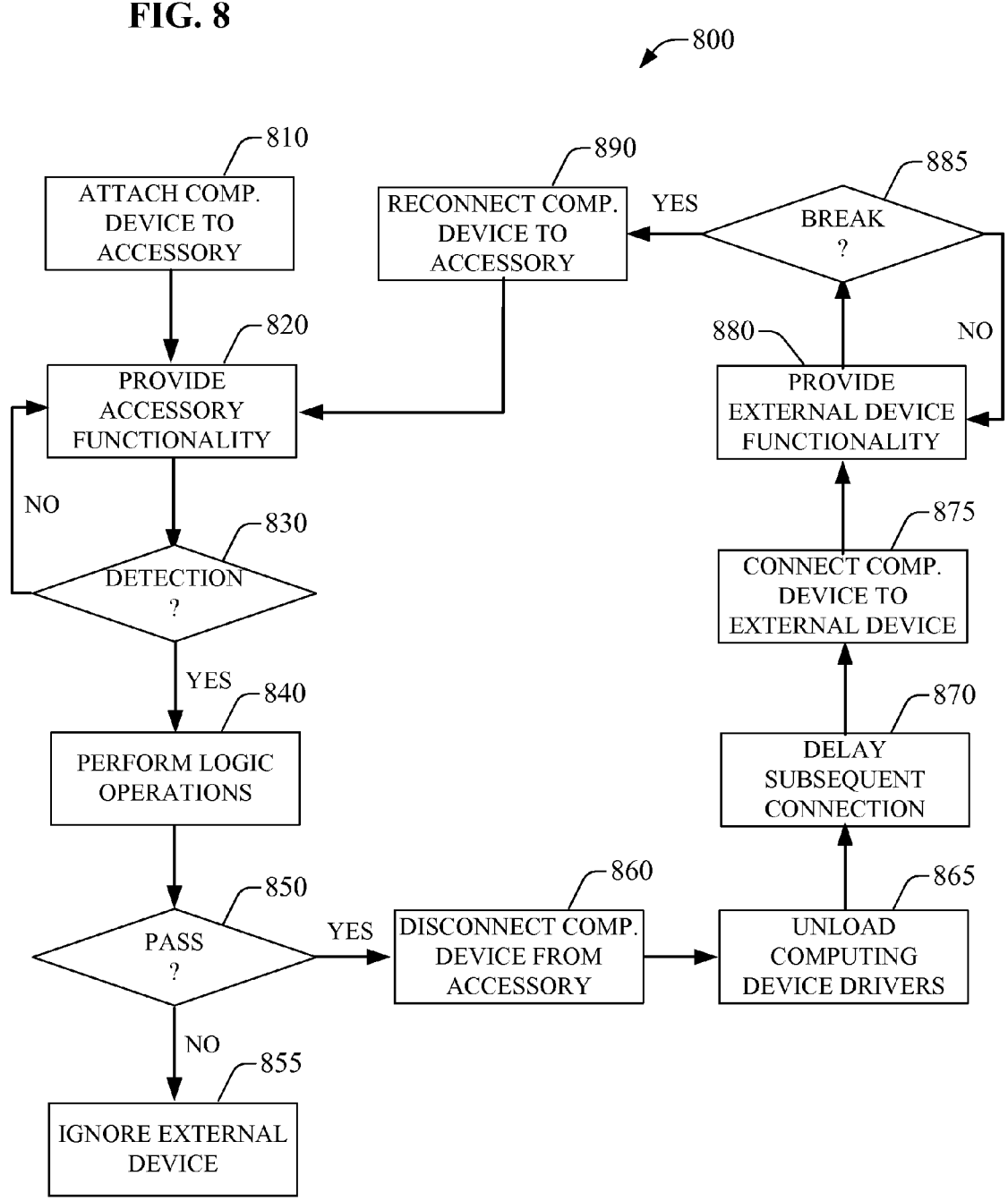
FIG. 8 is a flowchart of an exemplary methodology for facilitating USB pass-through connectivity between a computing device and a cradle device in accordance with an aspect of the subject specification.

To better illustrate aspects of exemplary system 700, a scenario for implementing system 700 is provided. For this particular scenario, it is assumed that computing device 710 is a handheld computing device and that USB accessory device 720 provides RFID (radio frequency identification) functionality to the handheld device 710, when attached. In FIG. 8, a flowchart of an exemplary methodology for facilitating USB pass-through connectivity between handheld device 710 and cradle device 730 is provided.

Process 800 begins at step 810 where handheld device 710 is attached to RFID accessory 720. Here, it should be appreciated that handheld device 710 may attach to RFID accessory 720 by mating connectors 712 and 724, as previously described. Once engaged, RFID accessory 720 begins to provide RFID functionality to handheld device 710 at step 820.

A determination is then made at step 830 as to whether the handheld device 710/RFID accessory 720 assembly has been placed into cradle device 730. In particular, a determination is made as to whether cradle device 730 is attempting to establish USB connectivity with RFID accessory 720 via mating connectors 722 and 734. Unless such detection is made, RFID accessory 720 continues to provide handheld device 710 with RFID functionality at step 820. Otherwise, if cradle device 730 is indeed detected, process 800 continues to step 840.

At step 840, RFID accessory 720 performs a set of logic operations so as to determine whether to establish pass-through USB connectivity between cradle device 730 and handheld device 710. Here, it should again be noted that such logic operations may be pre-programmed into RFID accessory 720 and/or provided by handheld device 710. In another embodiment, however, it should be appreciated that such logic may be provided to RFID accessory 720 from an external computing device (not pictured) via cradle device 730. Commands from such an external device may also be used to override existing logic operations that were pre-programmed into RFID accessory 720 and/or provided by handheld device 710.

At step 850, a determination is then made as to the outcome of the logic operations performed at step 840. If it is determined that pass through connectivity should not be granted, process 800 continues to step 855 where cradle device 730 is ignored. Such a configuration may be desirable if a user wanted to create a "scan stand," wherein the handheld device 710/RFID accessory 720 assembly continues to function as an RFID reader while being firmly held stationary by cradle device 730.

However, if a determination is made at step 850 that pass-through USB connectivity should indeed be provided, process 800 continues to step 860 where the USB connection between RFID accessory 720 and handheld device 710 is broken. Here, because step 860 may be performed entirely within RFID accessory 720, it should be noted that RFID accessory 720 may remain attached to handheld device 710. Once the USB connection between RFID accessory 720 and handheld device 710 has been broken, handheld device 710 may then unload its USB software drivers at step 865.

In order to ensure safe operability, a time delay may then be implemented at step 870 before connecting handheld device 710 to cradle device 730. Although an exemplary delay may be approximately one second, it should be appreciated that shorter/longer delays may also be implemented in which such delays may be fixed and/or variable. Here, such time delay variations may depend on the particular performance specifications of handheld device 710, RFID accessory 720, and/or cradle device 730.

After the appropriate time delay has elapsed, process 800 continues to step 875 where the internal circuitry of RFID accessory 720 is configured to provide pass-through USB connectivity between handheld device 710 and cradle device 730. Once connected, external USB device functionality may be provided to handheld device 710 at step 880 via cradle device 730. For instance, cradle device 730 may be linked to an external computing device which may download RFID data collected using handheld device 710 and/or upload necessary software updates onto handheld device 710.

At step 885, process 800 may then continue with a monitoring of the USB connection between handheld device 710 and cradle device 730. In an embodiment, the monitoring is performed by RFID accessory 720 such that the external computing device functionality provided to handheld device 710 at step 880 continues until a break in the USB connection between handheld device 710 and cradle device 730 is detected.

Once a break is detected at step 885, process 800 proceeds to step 890 where RFID accessory 720 re-establishes its USB connection with handheld device 710. Here, although not pictured, it should be appreciated that a time delay step may be included before reconnecting RFID accessory 720 to handheld device 710 (similar to step 870). Nevertheless, once re-connected at step 890, process 800 loops back to step 820 where RFID accessory 720 again provides handheld device 710 with RFID functionality.

Figure 9:
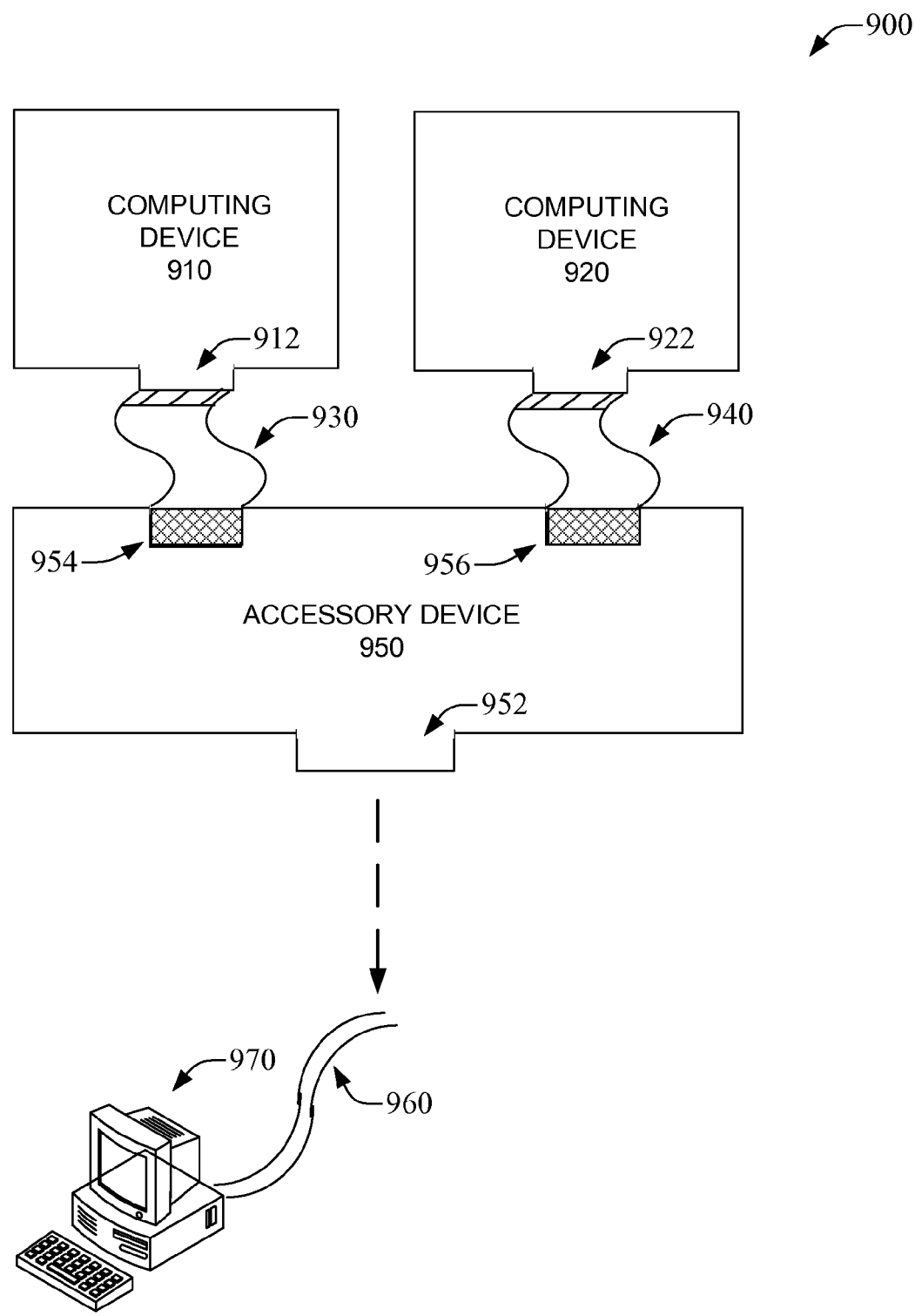
FIG. 9 is a schematic diagram illustrating an exemplary system for facilitating USB pass-through connectivity between a plurality of computing devices and a PC in accordance with an aspect of the subject specification.

Referring next to FIG. 9, a schematic diagram illustrating an exemplary system for facilitating USB pass-through connectivity between a plurality of computing devices and a PC in accordance with an aspect of the subject specification is provided. As illustrated, system 900 includes each of computing devices 910 and 920 connected via USB protocol to USB accessory device 950. Within such embodiment, these connections are achieved via USB cables 930 and 940, wherein USB connectors 912 and 922 are respectively connected to USB connectors 954 and 956 on USB accessory device 950. As illustrated, USB cable 960 may then be utilized to engage PC 970 with USB accessory device 954 via USB connector 952. Within such embodiment, the engaged assembly of USB accessory device 952 and each of computing devices 910 and 920 may thus continue to operate normally until engagement of PC 970 is detected, wherein such detection would cause accessory device 950 to determine whether to provide pass-through USB connectivity.

Figure 10:
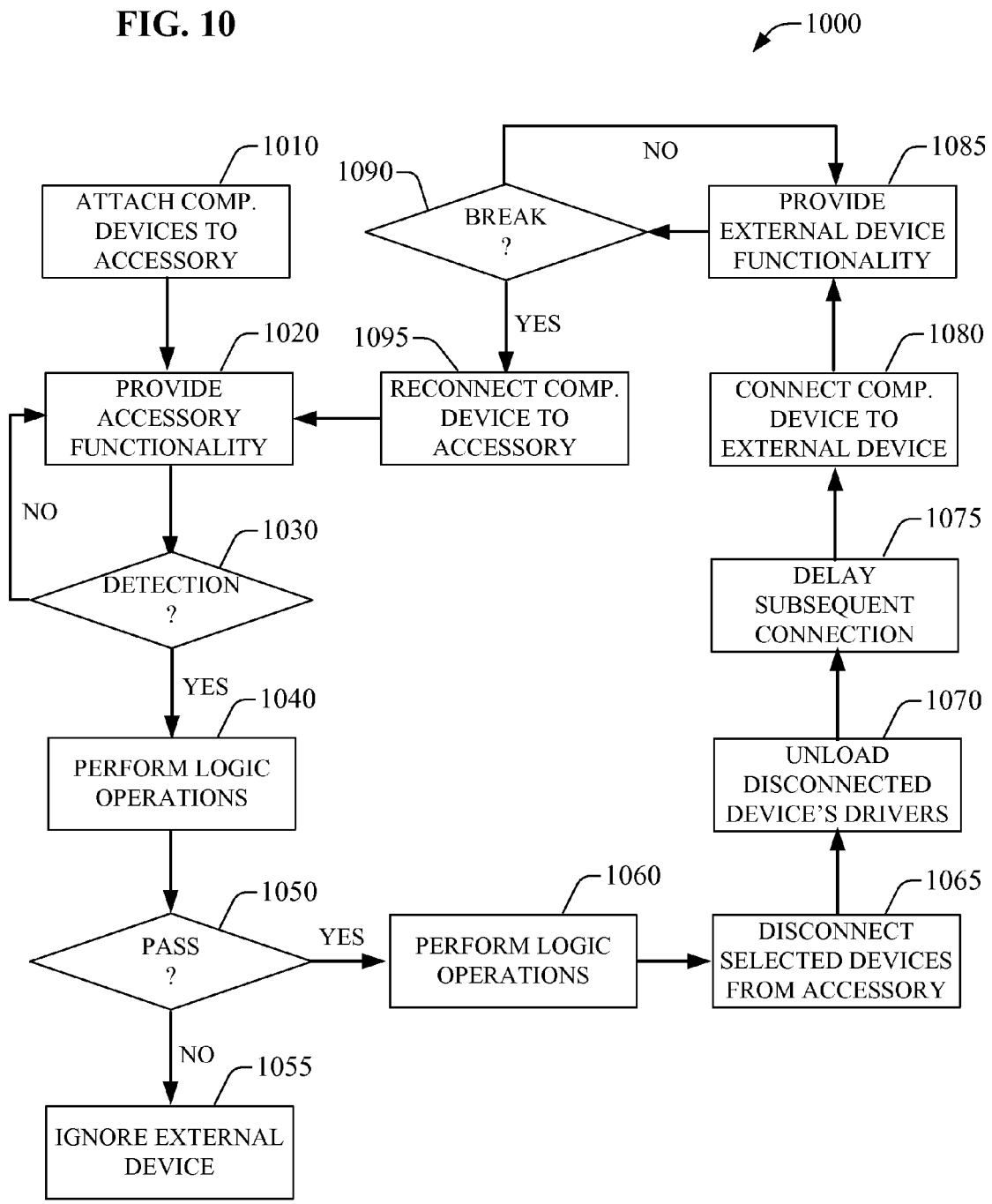
FIG. 10 is a flowchart of an exemplary methodology for facilitating USB pass-through connectivity between a plurality of computing devices and a PC in accordance with an aspect of the subject specification.

To better illustrate aspects of exemplary system 900, a scenario for implementing system 900 is provided. For this particular scenario, it is assumed that each of computing devices 910 and 920 is a handheld computing device and that USB accessory device 950 provides Biometric Smart Card functionality to handheld devices 910 and 920, when attached. Such a configuration may be desirable where multiple people are simultaneously collecting biometric data, wherein handheld devices 910 and 920 each require biometric accessory 950 to collect such data, and wherein purchasing individual biometric accessories for each handheld device is not cost effective. In FIG. 10, a flowchart of an exemplary methodology for facilitating USB pass-through connectivity between either of handheld devices 910 or 920 and PC 970 is provided. For brevity, similar steps already discussed with respect to process 800 are briefly mentioned.

As illustrated, process 1000 begins at step 1010 where each of handheld devices 910 and 920 are attached to biometric accessory 950. Here, because multiple USB computing devices are being connected, biometric accessory 950 may be configured to include a corresponding USB engine for each of handheld devices 910 and 920. Once connected to biometric accessory 950, each of handheld devices 910 and 920 are then provided with a biometric data-reading functionality at step 1020.

At step 1030, a determination is then made as to whether PC 970 is attempting to establish USB connectivity with biometric accessory 950 via USB connector 960. Unless such detection is made, biometric accessory 950 continues to provide each of handheld devices 910 and 920 with biometric data-reading functionality at step 1020. Otherwise, if PC 970 is indeed detected, process 1000 continues to step 1040.

At step 1040, biometric accessory 950 performs a set of logic operations so as to determine whether to establish pass-through USB connectivity between PC 970 and either of handheld devices 910 or 920. At step 1050, a determination is then made as to the outcome of the logic operations performed at step 1040. If it is determined that pass through connectivity should not be granted, process 1000 continues to step 1055 where PC 970 is ignored. Such a configuration may be desirable if, prior to completing the biometric data collection, a user was simply preparing to download the collected biometric data. Without such a safeguard, inadvertently connecting PC 970 to biometric accessory 950 may cause a loss of data.

However, if a determination is made at step 1050 that pass-through USB connectivity should indeed be provided, process 1000 continues to step 1060 where additional logic operations are performed. In particular, biometric accessory 950 must decide which of handheld devices 910 and 920 to connect to PC 970. Such logic operations may include any of a plurality of algorithms for making such decision. For instance, pass-through connectivity might be provided according to usage, wherein current use and/or length of use may be used.

Upon determining which of handheld devices 910 and 920 to connect to PC 970, process 1000 continues to step 1065 where the USB connection between biometric accessory 950 and the selected handheld device, 910 or 920, is broken. Here, because only one of handheld devices 910 and 920 is disconnected, it should be noted that biometric accessory 950 may continue to provide biometric data-reading functionality to the handheld device, 910 or 920, not disconnected at step 1065.

Once the USB connection between biometric accessory 950 and the selected handheld device, 910 or 920, has been broken, the selected handheld device, 910 or 920, may then unload its USB software drivers at step 1070. A time delay may then be implemented at step 1075 before connecting the selected handheld device, 910 or 920, to PC 970. After the appropriate time delay has elapsed, process 1000 continues to step 1080 where biometric accessory 950 provides pass-through USB connectivity between the selected handheld device, 910 or 920, and computing device 970.

Once connected, process 1000 continues to step 1085 where PC 970 provides any of a plurality of functions to the selected handheld device, 910 or 920. For instance, PC 970 may download biometric data collected using the selected handheld device, 910 or 920, and/or upload necessary software updates. At step 1090, the USB connection between the selected handheld device, 910 or 920, and PC 970 is then monitored such that the USB functionality provided to the selected handheld device, 910 or 920, at step 1085 continues until a break in the USB connection between the selected handheld device, 910 or 920, and PC 970 is detected.

Once a break is detected at step 1090, process 1000 proceeds to step 1095 where biometric accessory 950 re-establishes its USB connection with the disconnected/selected handheld device, 910 or 920. Once re-connected at step 1095, process 1000 loops back to step 1020 where biometric accessory 950 again provides each of handheld devices 910 and 920 with biometric data-reading functionality.

Figure 11:
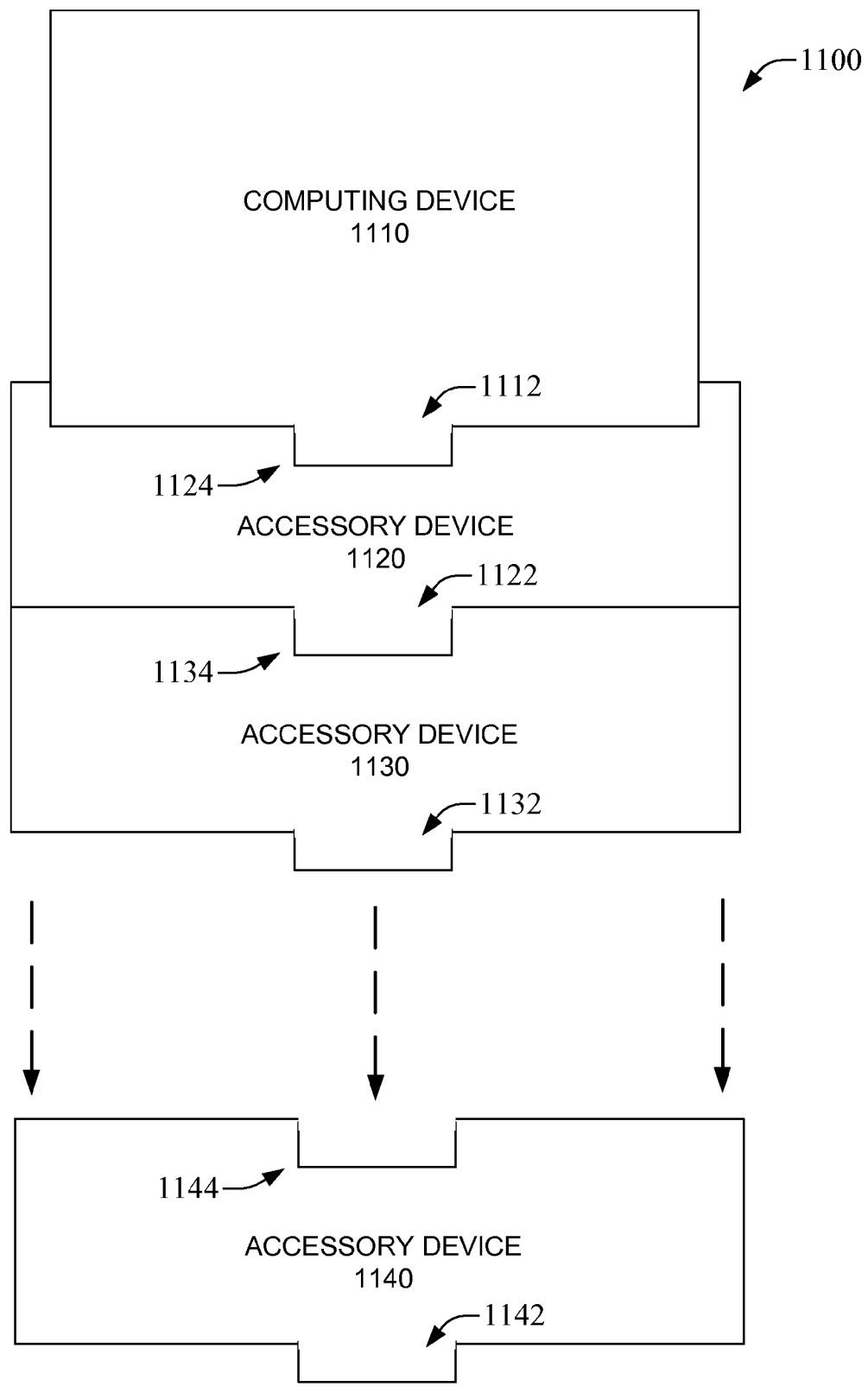
FIG. 11 is a schematic diagram illustrating an exemplary system for facilitating USB pass-through connectivity between a computing device and a plurality of USB accessory devices in accordance with an aspect of the subject specification.

Referring next to FIG. 11, a schematic diagram illustrating an exemplary system for facilitating USB pass-through connectivity between a computing device and a plurality of USB accessory devices in accordance with an aspect of the subject specification is provided. As illustrated, system 1100 includes computing device 1110 attached to USB accessory device 1120. Within such embodiment, this attachment is achieved by mating male USB connector 1112 of computing device 1110 with female USB connector 1124 of USB accessory device 1120. USB accessory device 1120, however, also attaches to accessory device 1130 by mating male USB connector 1122 with female USB connector 1134, as shown. Within such embodiment, the engaged assembly of computing device 1110, USB accessory device 1120, and USB accessory device 1130 may then be attached as a single unit to USB accessory device 1140 by mating male USB connector 1132 with female USB connector 1144.

Figure 12:
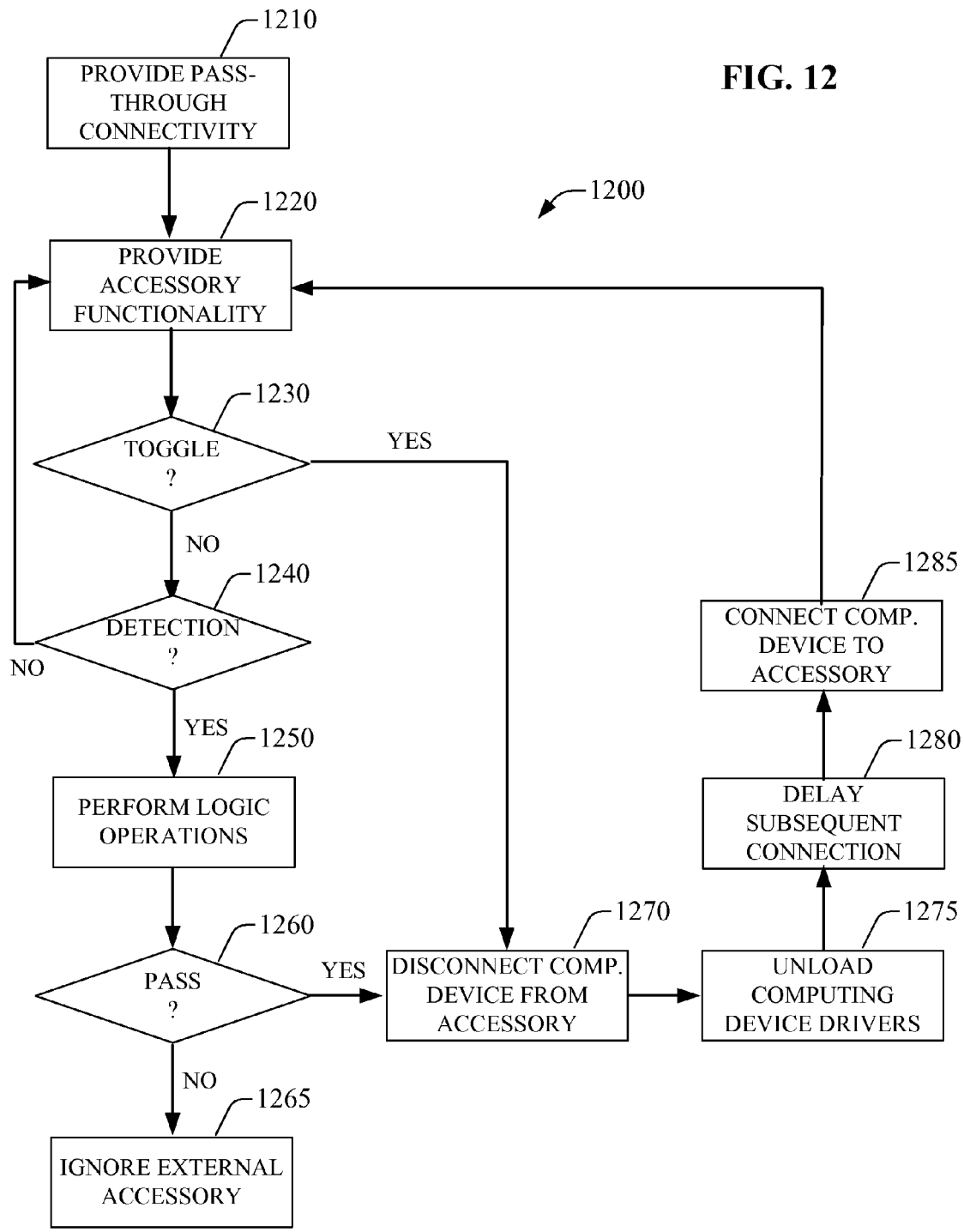
FIG. 12 is a flowchart of an exemplary methodology for facilitating USB pass-through connectivity between a computing device and a plurality of USB accessory devices in accordance with an aspect of the subject specification.

To better illustrate aspects of exemplary system 1100, a scenario for implementing system 1100 is provided. For this particular scenario, it is assumed that computing device 1110 is a handheld gaming device with USB connectivity and that each of USB accessory devices 1120, 1130, and 1140 provide a unique gaming functionality to gaming device 1110, when attached. Such a configuration may be desirable where gaming accessories for a particular handheld gaming device 1110 are sold as separate USB devices, wherein each of the gaming accessories 1120, 1130, and 1140 provides a unique gaming feature/functionality to the gaming device 1110. In FIG. 12, a flowchart of an exemplary methodology for facilitating USB pass-through connectivity between gaming device 1110 and either of gaming accessories 1120, 1130, or 1140 is provided. For brevity, similar steps already discussed with respect to either of processes 800 or 1000 are briefly mentioned.

As illustrated, process 1200 begins at step 1210 where pass-through USB connectivity is already assumed to be established. Moreover, for this particular scenario, it is assumed that gaming accessory 1120 is already providing pass-through USB connectivity between gaming device 1110 and gaming accessory 1130, wherein gaming accessory 1140 is not yet engaged with gaming accessory 1130. Assuming these circumstances, process 1200 then continues to step 1220 where gaming device 1110 is provided with the unique gaming features/functions of gaming accessory 1130 (e.g., special weapons, powers, graphics, etc.).

For this particular embodiment, the pass-through USB connectivity between gaming device 1110 and gaming accessory 1130 is provided by gaming accessory 1120. As such, gaming accessory 1120 may be configured to provide a toggling feature in which gaming device 1110 toggles between features/functions provided by any gaming accessory for which gaming accessory 1120 could provide USB connectivity. Here, because it is assumed that only gaming accessories 1120 and 1130 are attached, gaming device 1110 may only toggle between gaming accessories 1120 and 1130. However, if and when gaming accessory 1140 is attached, gaming device 1110 may further access the features/functions provided by gaming accessory 1140.

Process 1200 thus continues at step 1230 where a determination is made as to whether a toggle command has been entered. If so, the gaming accessory currently connected via USB to gaming device 1110 is disconnected at step 1270. For instance, if the toggle command was such that features/functions from gaming accessory 1120 were now desired, gaming accessory 1120 may cause the pass-through USB connectivity between gaming device 1110 and gaming accessory 1130 to be broken at step 1270.

Once the USB connection between gaming device 1110 and gaming accessory 1130 has been broken, gaming device 1110 may then unload its USB software drivers at step 1275. A time delay may then be implemented at step 1280 before re-establishing the USB connection between gaming device 1110 and gaming accessory 1120 at step 1285. Once connected, process 1200 loops back to step 1220, wherein the features/functions of gaming accessory 1120 are now provided to gaming device 1110.

However, if a toggle command was not provided at step 1230, it should be noted that process 1200 would have continued to step 1240. Here, it is assumed that gaming accessory 1120 is again providing pass-through USB connectivity between gaming device 1110 and gaming accessory 1130. At step 1240, a determination is made as to whether another gaming accessory 1140 is attempting to establish USB connectivity with gaming accessory 1130. Unless such detection is made, gaming accessory 1130 continues to provide gaming device 1110 with its unique features/functions at step 1220. Otherwise, if gaming accessory 1140 is indeed detected, process 1200 continues to step 1250.

At step 1250, gaming accessory 1130 performs a set of logic operations so as to determine whether to establish pass-through USB connectivity between gaming device 1110 and gaming accessory 1140. At step 1255, a determination is then made as to the outcome of the logic operations performed at step 1250. If it is determined that pass through connectivity should not be granted, process 1200 continues to step 1265 where gaming accessory 1140 is ignored. Such a configuration may be desirable if, during a game, a user attached gaming accessory 1140 in preparation for future use (i.e., later in the game).

If, however, it is determined that pass-through USB connectivity should indeed be provided, process 1200 proceeds to step 1270 where the USB connection between gaming accessory 1130 and gaming device 1110 is broken. Here, it should be appreciated that step 1270 is performed within gaming accessory 1130 (compare with previous step 1270 where the USB connection between gaming accessory 1130 and gaming device 1110 was broken by gaming accessory 1120).

Once the USB connection between gaming device 1110 and gaming accessory 1130 has been broken, gaming device 1110 may then unload its USB software drivers at step 1275. A time delay may then be implemented at step 1280 before establishing a pass-through USB connection between gaming device 1110 and gaming accessory 1140 at step 1285. Here, it should be appreciated that the USB connection between gaming device 1110 and gaming accessory 1140 actually includes a first pass-through USB connection between gaming device 1110 and 1130 (provided by gaming accessory 1120) and a second pass-through USB connection between gaming accessory 1140 and gaming accessory 1120 (provided by gaming accessory 1130). Once connected, process 1200 loops back to step 1220, wherein the features/functions of gaming accessory 1140 are now provided to gaming device 1110.

Figure 13:
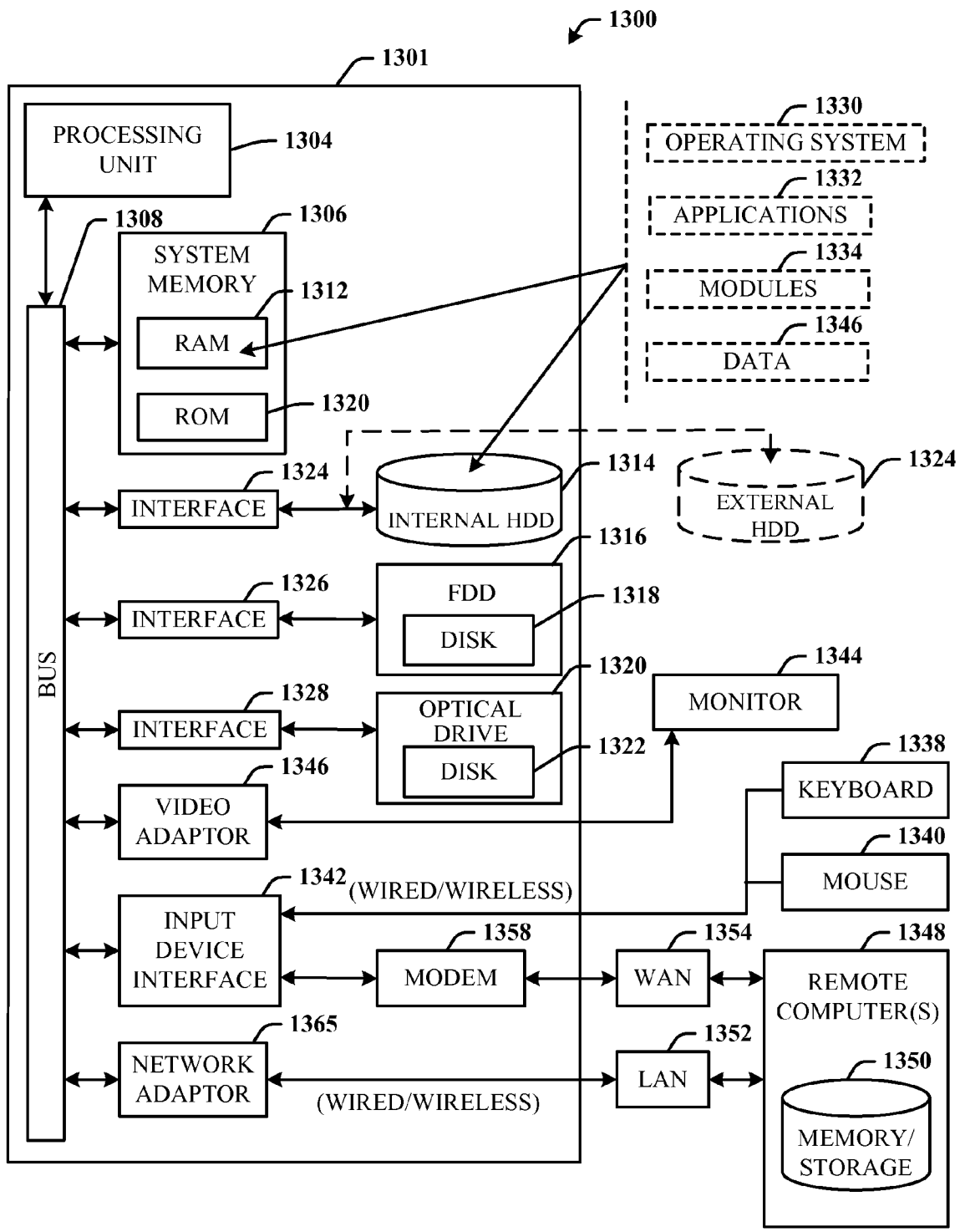
FIG. 13 illustrates a block diagram of a computing device operable to facilitate the disclosed USB pass-through connectivity.
Figure 6:
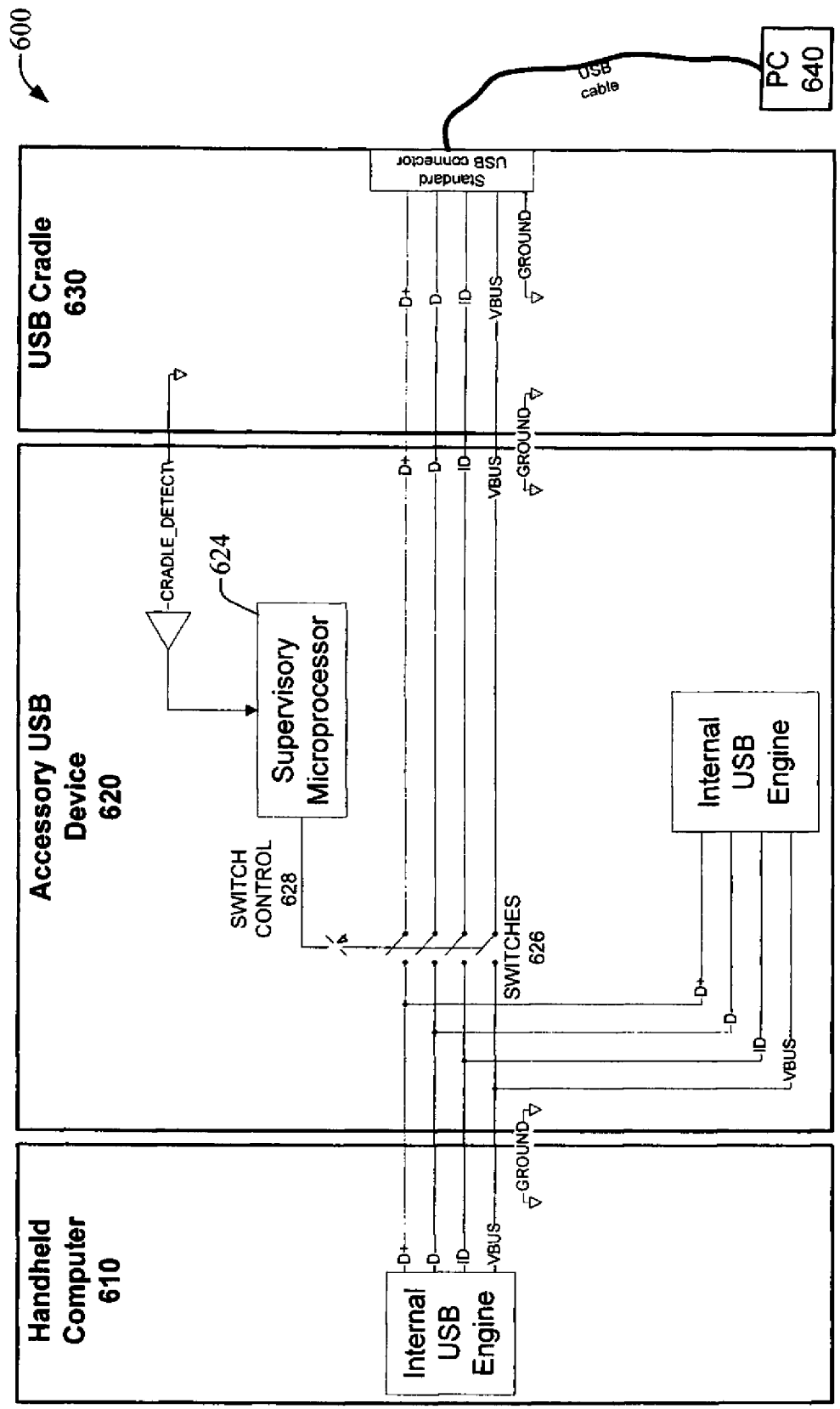

In order to provide additional context for various aspects of the disclosed innovation, FIG. 13 and the following discussion are intended to provide a brief, general description of a suitable computing environment 1300 in which the various aspects of the innovation can be implemented. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 2394 serial port, a game port, a USB port, an IR interface, etc.

A monitor 1344 or other type of display device is also connected to the system bus 1308 through an interface, such as a video adapter 1346. In addition to the monitor 1344, a computer typically includes other peripheral output devices (not shown), such as speakers, printers, etc.

The computer 1302 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A universal serial bus (USB) accessory device, comprising:
   at least one USB engine component;
   a computing device-USB connector component, the computing device-USB connector component configured to provide USB connectivity between the at least one USB engine component and at least one corresponding computing device;
   an external-USB connector component, the external-USB connector component configured to provide USB connectivity between the at least one computing device and an external device;
   a detection component, the detection component configured to detect if the external device is engaging with the USB accessory device; and
   a processor coupled to the detection component and configured to execute a set of logic operations upon detecting that the external device is engaging with the USB accessory device, the set of logic operations determining whether to provide the USB connectivity between the at least one computing device and the external device, the USB connectivity between the at least one computing device and the external device only established after breaking the USB connectivity between the at least one USB engine component and the at least one corresponding computing device.

2. The device of claim 1, the external-USB connector component further configured to provide USB connectivity between the at least one USB engine component to the external device, the set of logic operations determining whether to establish the USB connectivity between the at least one USB engine component to the external device after breaking the USB connectivity between the at least one USB engine component to the at least one corresponding computing device.

3. The device of claim 1 further comprising a memory component, the memory component configured to store the set of logic operations.

4. The device of claim 1, the set of logic operations received from the at least one computing device.

5. The device of claim 1 further comprising a timing component, the timing component coupled to the processor and configured to determine whether an appropriate time delay has elapsed for establishing the USB connectivity between the at least one computing device and the external device.

6. The device of claim 1, the detection component further configured to detect if the external device is disengaging from the USB accessory device, the processor further configured to re-establish the USB connectivity between the at least one USB engine component and the at least one corresponding computing device upon detecting that the external device is disengaging from the USB accessory device.

7. The device of claim 1, the detection component further configured to detect if the external device is engaged by a subsequent device, the processor further configured to establish USB connectivity between the at least one computing device and the subsequent device.

8. The device of claim 7, the processor further configured to execute instructions for toggling between establishing the USB connectivity between the at least one computing device and the external device and establishing the USB connectivity between the at least one computing device and the subsequent device.

9. A method for facilitating pass-through universal serial bus (USB) connectivity, comprising:
   engaging at least one computing device with an accessory device, the at least one computing device connecting to a corresponding USB engine in the accessory device;
   detecting a signal corresponding to an engagement of an external device to the accessory device;
   determining whether to disconnect the at least one computing device from the corresponding USB engine upon detecting the engagement of the external device to the accessory device, the determining step being a function of a set of logic operations; and
   establishing a USB connection between the at least one computing device and the external device as a function of the set of logic operations, the USB connection connecting the at least one computing device and the external device only if the at least one computing device has been disconnected from the accessory device.

10. The method of claim 9 further comprising configuring the set of logic operations, the set of logic operations configured by the at least one computing device.

11. The method of claim 9 further comprising configuring the set of logic operations, the set of logic operations configured by the accessory device.

12. The method of claim 9, the engaging step comprising engaging at least two computing devices with the accessory device, the determining step comprising determining whether to disconnect any of the at least two computing devices from their respective corresponding USB engines, and the establishing step comprising establishing the USB connection between one of the at least two computing devices and the external device as a function of the set of logic operations, the USB connection connecting the one of the at least two computing devices and the external device only if the one of the at least two computing devices has been disconnected from the accessory device.

13. The method of claim 9 further comprising establishing a USB connection between the accessory device and the external device as a function of the set of logic operations, the USB connection between the accessory device and the external device connecting the accessory device and the external device only if the at least one computing device has been disconnected from the accessory device.

14. The method of claim 9, the establishing step further comprising establishing the USB connection after a predetermined time delay.

15. The method of claim 9 further comprising providing at least one software application to the at least one computing device, the at least one software application provided by the accessory device.

16. A system that facilitates pass-through universal serial bus (USB) connectivity, comprising:
   means for attaching at least one computing device to an accessory device, the at least one computing device connecting to a corresponding USB engine in the accessory device;
   means for detecting a signal corresponding to an engagement of an external device to the accessory device;
   means for ascertaining whether to disconnect the at least one computing device from the corresponding USB engine upon detecting the engagement of the external device to the accessory device, the means for ascertaining being a function of a set of logic operations; and
   means for providing a USB connection between the at least one computing device and the external device as a function of the set of logic operations, the USB connection connecting the at least one computing device and the external device only if the at least one computing device has been disconnected from the accessory device.

17. The system of claim 16, the means for attaching comprising means for attaching at least two computing devices to the accessory device, the means for ascertaining comprising means for ascertaining whether to disconnect any of the at least two computing devices from their respective corresponding USB engines, and the means for providing comprising means for providing the USB connection between one of the at least two computing devices and the external device as a function of the set of logic operations, the USB connection connecting the one of the at least two computing devices and the external device only if the one of the at least two computing devices has been disconnected from the accessory device.

18. A system of claim 16, the means for providing further comprising means for providing the USB connection after a time delay.

19. The system of claim 16, the means for detecting further comprising means for detecting a signal corresponding to an engagement of a subsequent device to the external device, and further comprising means for providing a USB connection between the at least one computing device and the subsequent device.

20. The system of claim 16, the means for detecting further comprising means for detecting a signal corresponding to a disengagement of the external device from the accessory device, and further comprising means for reconnecting the at least one computing device to the corresponding USB engine upon detecting that the external device is disengaging from the USB accessory device.

* * * * *

UNITED STATES PATENT AND TRADEMARK OFFICE
CERTIFICATE OF CORRECTION

PATENT NO. : 7,945,717 B2  Page 1 of 1
APPLICATION NO. : 12/331152
DATED : May 17, 2011
INVENTOR(S) : Rivalsi It is certified that error appears in the above-identified patent and that said Letters Patent is hereby corrected as shown below:

In Fig. 6, Sheet 6 of 13,
delete

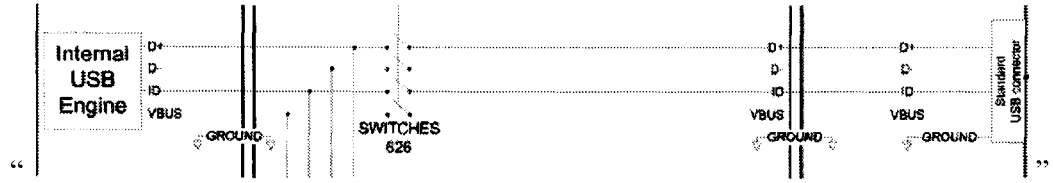

and insert

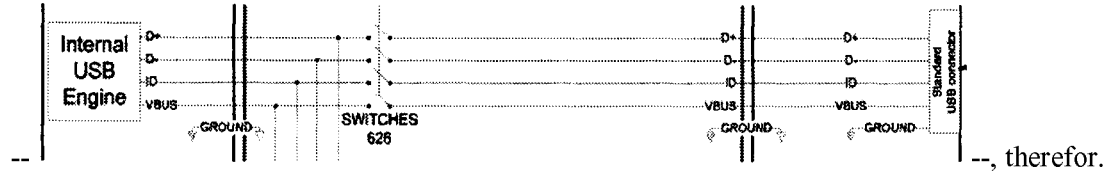

--, therefor.

Signed and Sealed this
Nineteenth Day of February, 2013

Teresa Stanek Rea
*Acting Director of the United States Patent and Trademark Office*

UNITED STATES PATENT AND TRADEMARK OFFICE
CERTIFICATE OF CORRECTION

PATENT NO.        : 7,945,717 B2
APPLICATION NO.   : 12/331152
DATED             : May 17, 2011
INVENTOR(S)       : Kenneth Rivalsi It is certified that error appears in the above-identified patent and that said Letters Patent is hereby corrected as shown below:

Delete Drawing Sheet 6 of 13 and substitute therefor with the attached Drawing Sheet 6 of 13 consisting of replacement FIG. 6.

This certificate supersedes the Certificate of Correction issued February 19, 2013.

Signed and Sealed this
Second Day of April, 2013

Teresa Stanek Rea
*Acting Director of the United States Patent and Trademark Office*